US011645562B2

United States Patent
Imamura et al.

(10) Patent No.: US 11,645,562 B2
(45) Date of Patent: May 9, 2023

(54) SEARCH POINT DETERMINING METHOD AND SEARCH POINT DETERMINING APPARATUS

(71) Applicant: FUJITSU LIMITED, Kawasaki (JP)

(72) Inventors: Nobutaka Imamura, Yokohama (JP); Akira Ura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 983 days.

(21) Appl. No.: 16/297,850

(22) Filed: Mar. 11, 2019

(65) Prior Publication Data

US 2019/0287010 A1  Sep. 19, 2019

(30) Foreign Application Priority Data

Mar. 14, 2018  (JP) .............................. JP2018-047063

(51) Int. Cl.
*G06N 20/00* (2019.01)
*G06N 5/048* (2023.01)
*G06F 16/903* (2019.01)
*G06N 7/01* (2023.01)

(52) U.S. Cl.
CPC ............ *G06N 5/048* (2013.01); *G06F 16/903* (2019.01); *G06N 7/01* (2023.01); *G06N 20/00* (2019.01)

(58) Field of Classification Search
CPC ........ G06N 5/048; G06N 20/00; G06N 7/005; G06F 16/903
See application file for complete search history.

(56) References Cited

U.S. PATENT DOCUMENTS

2014/0358831 A1* 12/2014 Adams .................. G06N 20/00
706/20

FOREIGN PATENT DOCUMENTS

JP  2002-149618  5/2002

OTHER PUBLICATIONS

Snoek, J., Larochelle, H. and Adams, R.P., 2012. Practical bayesian optimization of machine learning algorithms. Advances in neural information processing systems, 25. (Year: 2012).*
Zuluaga, M., Sergent, G., Krause, A. and Püschel, M., 2013, February. Active learning for multi-objective optimization. In International Conference on Machine Learning (pp. 462-470). PMLR. (Year: 2013).*
Azimi, J., Jalali, A. and Fern, X., 2012. Hybrid batch Bayesian optimization. arXiv preprint arXiv:1202.5597. (Year: 2012).*

(Continued)

*Primary Examiner* — David R Vincent
(74) *Attorney, Agent, or Firm* — Fujitsu Patent Center

(57) ABSTRACT

A search point determining method in an estimation process of a function, executed by a processor included in a search point determining apparatus, the method includes, calculating a search prediction time and a confidence interval upper limit obtained by using a Gaussian process for the function in each search candidate point from a past search result of the function, generating an area in a parameter space for each search candidate point by using a position of a search point close to the relevant search candidate point in a past search result, a search prediction time corresponding to each search candidate point, and a confidence interval upper limit corresponding to each search candidate point, and determining a search point based on a size of the area in a plurality of parameter spaces.

11 Claims, 12 Drawing Sheets

(56) References Cited

OTHER PUBLICATIONS

Snoek, J., Larochelle, H. and Adams, R., 2011. Opportunity cost in Bayesian optimization. In NIPS Workshop on Bayesian Optimization, Sequential Experimental Design, and Bandits. (Year: 2011).*
Hennig, P. and Schuler, C.J., 2012. Entropy Search for Information-Efficient Global Optimization. Journal of Machine Learning Research, 13(6). (Year: 2012).*
J. Snoek et al., "Practical Bayesian Optimization of Machine Learning Algorithms", In Advances in Neural Information Processing Systems 25 (NIPS'12), pp. 2951-2959, 2012 (9 pages).

* cited by examiner

FIG. 9

| START TIME | CURRENT TIME | END TIME | REMAINING TIME |
|---|---|---|---|
| 10:00:00 | 14:00:00 | 18:00:00 | 04:00:00 |

124

SEARCH POINT DETERMINING METHOD AND SEARCH POINT DETERMINING APPARATUS

CROSS-REFERENCE TO RELATED APPLICATION

This application is based upon and claims the benefit of priority of the prior Japanese Patent Application No. 2018-047063, filed on Mar. 14, 2018, the entire contents of which are incorporated herein by reference.

FIELD

The embodiments discussed herein are related to a search point determining method and a search point determining apparatus.

BACKGROUND

A service development based on machine learning or neural networks has been carried out in recent years. In the machine learning or the neural networks, it becomes important to optimize parameters according to data to be handled, and the number of combinations of multiple parameters becomes enormous. In a search for the combination of the parameters, a method such as a grid search or a Bayesian optimization is used. In the grid search, a parameter space of a function is split into lattice shapes, and search is performed for each lattice point to increase the processing amount. The Bayesian optimization assumes to follow a Gaussian process having an unknown solution and performs the search by predicting a point where the solution becomes the smallest (or the largest) from the Gaussian process passing through a known point, and repeats obtaining a new search point by updating the Gaussian process from a search result. That is, since the Bayesian optimization performs the search while predicting where the solution is located, the processing amount may be suppressed as compared with the grid search. Further, a Bayesian optimization considering an execution time has been proposed. In addition, in the search near the search point where the search has been completed, it has been suggested that a calculation result of the search point completed with the search be re-used in order to shorten the calculation time.

As for a parameter search, it has been proposed that one computer among a plurality of computers is set as a server, a search history of all of the computers is held in the server, and another computer inquires of the server whether a parameter set has been searched, so as to efficiently perform the parameter search.

Related techniques are disclosed in, for example, Japanese Laid-open Patent Publication No. 2002-149618.

Related techniques are also disclosed in, for example, J. Snoek et. al., "Practical Bayesian Optimization of Machine Learning Algorithms," In Advances in Neural Information Processing Systems 25 (NIPS '12), pp. 2951-2959 2012.

SUMMARY

According to an aspect of the embodiments, a search point determining method in an estimation process of a function, executed by a processor included in a search point determining apparatus, the method includes, calculating a search prediction time and a confidence interval upper limit obtained by using a Gaussian process for the function in each search candidate point from a past search result of the function, generating an area in a parameter space for each search candidate point by using a position of a search point close to the relevant search candidate point in a past search result, a search prediction time corresponding to each search candidate point, and a confidence interval upper limit corresponding to each search candidate point, and determining a search point based on a size of the area in a plurality of parameter spaces.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a progress management memory;

DESCRIPTION OF EMBODIMENTS

Since the combination of parameters is enormous, it is difficult to perform all the searches within the closing time of a business day. For example, when the artificial intelligence used for Frequently Asked Questions (FAQ) of a call center is tuned, it is required to finish the work between the closing time of a business day and a beginning time of a next business day. In this way, when there is a time limit, for example, it may be conceivable to apply the scheme based on Snoek while reusing the calculation result. However, in the scheme based on Snoek described above, since it is evaluated how much an evaluation value will be improved per unit time from a current best evaluation value, only combinations of parameters that may reuse the calculation result are selected and different places are not searched, and as a result, the search point is biased. Further, in the scheme based on Snoek, since the closing time is not considered, there is a possibility of continuously searching for a point having low confidence even when the closing time is near. For this reason, it may be difficult to optimize the parameters when there is a time limit.

Embodiments of a search point determining program, a search point determining method, and a search point determining device according to the present disclosure will be described in detail below with reference to the accompanying drawings. Further, the present disclosure is not limited by the embodiments. Further, the following embodiments may be appropriately combined with each other within a scope that does not cause any inconsistency.

Embodiments

Figure 1:
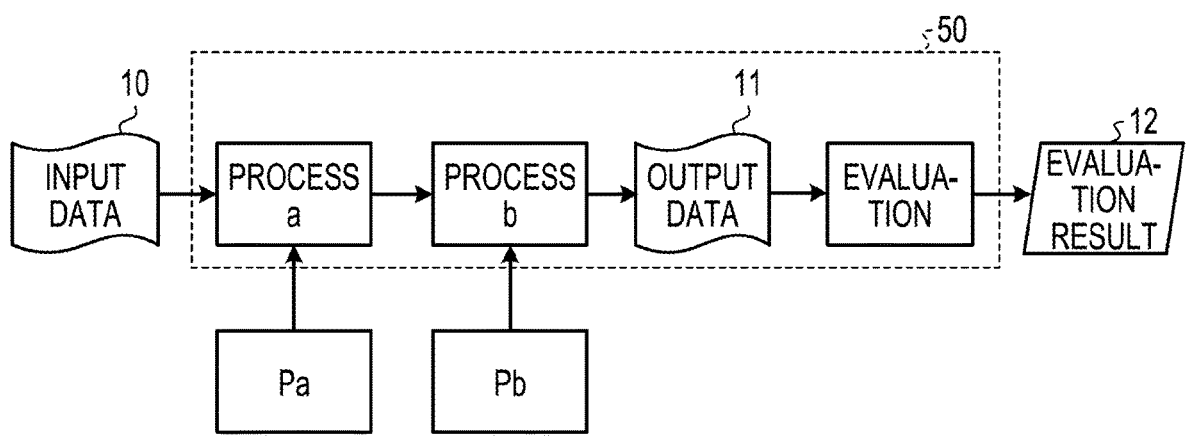
FIG. 1 is a diagram illustrating an example of a process of an evaluation object.

FIG. 1 is a diagram illustrating an example of a process of an evaluation object. First, a process in an evaluation object 50 will be described with reference to FIG. 1. Input data 10 is input into the evaluation object 50 illustrated in FIG. 1. The evaluation object 50 includes, for example, a process "a" and a process "b." The processes "a" and "b" have adjustable parameters Pa and Pb, respectively. Further, each of the parameters Pa and Pb is a vector having one or more parameters. The evaluation object 50 acquires output data 11 by executing the process "a" and the process "b" on the input data 10. The evaluation object 50 acquires an evaluation result 12 by evaluating the output data 11. In the evaluation object 50, the parameters Pa and Pb are optimized so that the evaluation result 12 is best.

That is, the process executed by the evaluation object 50 minimizes or maximizes a result of an evaluation function (process b (Pb, process a (Pa, and input data 10))). Here, when the parameter Pb is changed without changing the parameter Pa, the result of the process "a" may be reused. That is, the result of the process "a" may be memorized.

Figure 2:
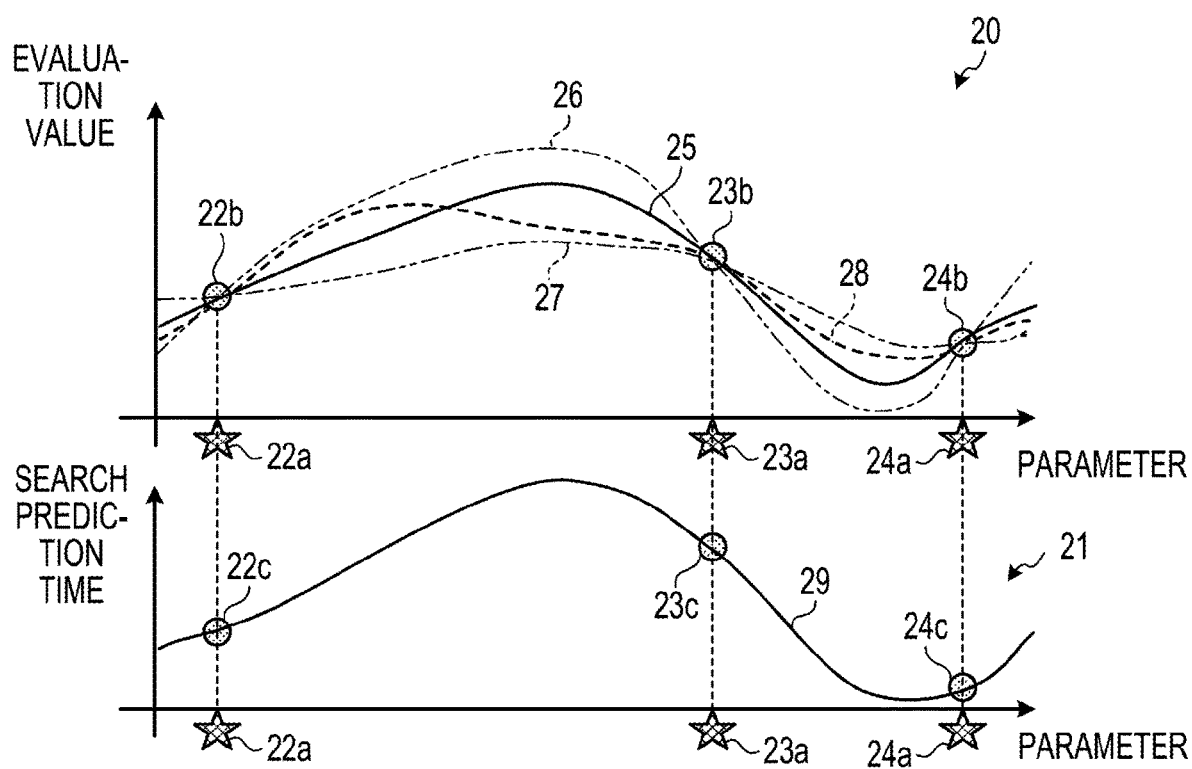
FIG. 2 is a diagram illustrating an example of Bayesian optimization.

Next, the Bayesian optimization used for an optimization of the parameters Pa and Pb will be described with reference to FIGS. 2 to 5. FIG. 2 is a diagram illustrating an example of the Bayesian optimization. A graph 20 and a graph 21 illustrated in FIG. 2 are graphs representing the function of the evaluation object and a search prediction time for each parameter (search point). In the Bayesian optimization, for example, search points 22a, 23a, and 24a are randomly determined as an initial search. That is, in the initial search, parameters corresponding to the search points 22a, 23a, and 24a are determined. Next, in the Bayesian optimization, output data in a case where the parameters corresponding to the search points 22a, 23a, and 24a are respectively set for the process is evaluated. In the graph 20, the evaluation result is represented by evaluation values 22b, 23b, and 24b.

In the Bayesian optimization, a function 25 of an expected value passing through the evaluation values 22b, 23b, and 24b, and a confidence interval upper limit 26 and a confidence interval lower limit 27 obtained by using the Gaussian process for the function 25 are calculated. Further, a function 28 in the graph 20 is a true value of the evaluation value in the function of the evaluation object, which is unknown before the evaluation. In addition, the confidence interval upper limit 26 and the confidence interval lower limit 27 indicate a range of 95% in a normal distribution of the evaluation values. That is, the true value of the evaluation value in the function of the evaluation object indicates that the evaluation value exists between the confidence interval upper limit 26 and the confidence interval lower limit 27 at a probability of 95%. That is, the function 25, the confidence interval upper limit 26, and the confidence interval lower limit 27 are obtained by predicting an expected value of the function of the evaluation object and a width of the evaluation object.

In the Bayesian optimization, a function 29 of the search prediction time is calculated based on search times 22c, 23c, and 24c at the time of determining the search points 22a, 23a, and 24a. In addition, in FIG. 2, with respect to the graph 21 representing the search prediction time as well, the search points 22a, 23a, and 24a are illustrated.

Figure 3:
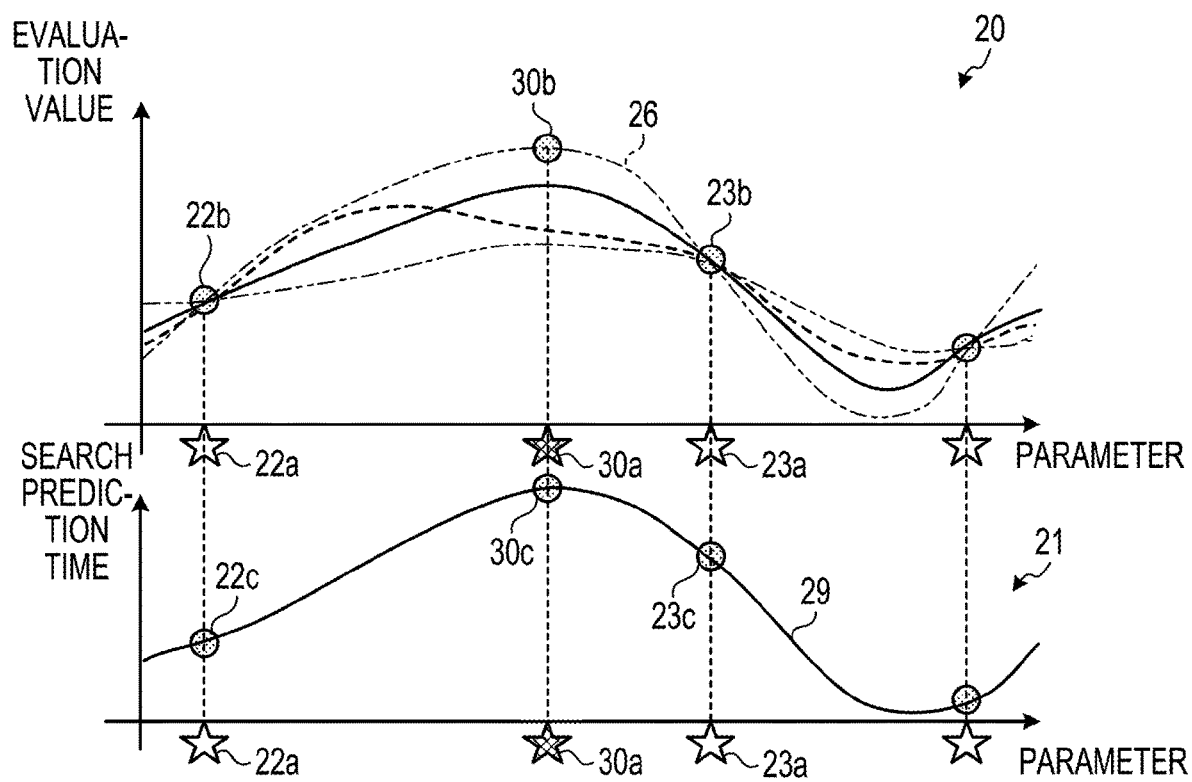
FIG. 3 is a diagram illustrating an example of determination of a new search point in Bayesian optimization.

FIG. 3 is a diagram illustrating an example of determination of a new search point in Bayesian optimization. FIG. 3 illustrates a case where the new search point is determined from the state of FIG. 2. In the Bayesian optimization, for example, a search point 30a becomes the new search point, which corresponds to an evaluation value 30b which is a maximum point of the confidence interval upper limit 26, between the search point 22a and the search point 23a of the graph 20, that is, between the evaluation value 22b and the evaluation value 23b. However, in the graph 21, a search prediction time 30c corresponding to the search point 30a is a search prediction time longer than the search times 22c and 23c, and when the evaluation is performed by adopting the search point 30a as it is, the evaluation may not be completed within a time limit.

Figure 4:
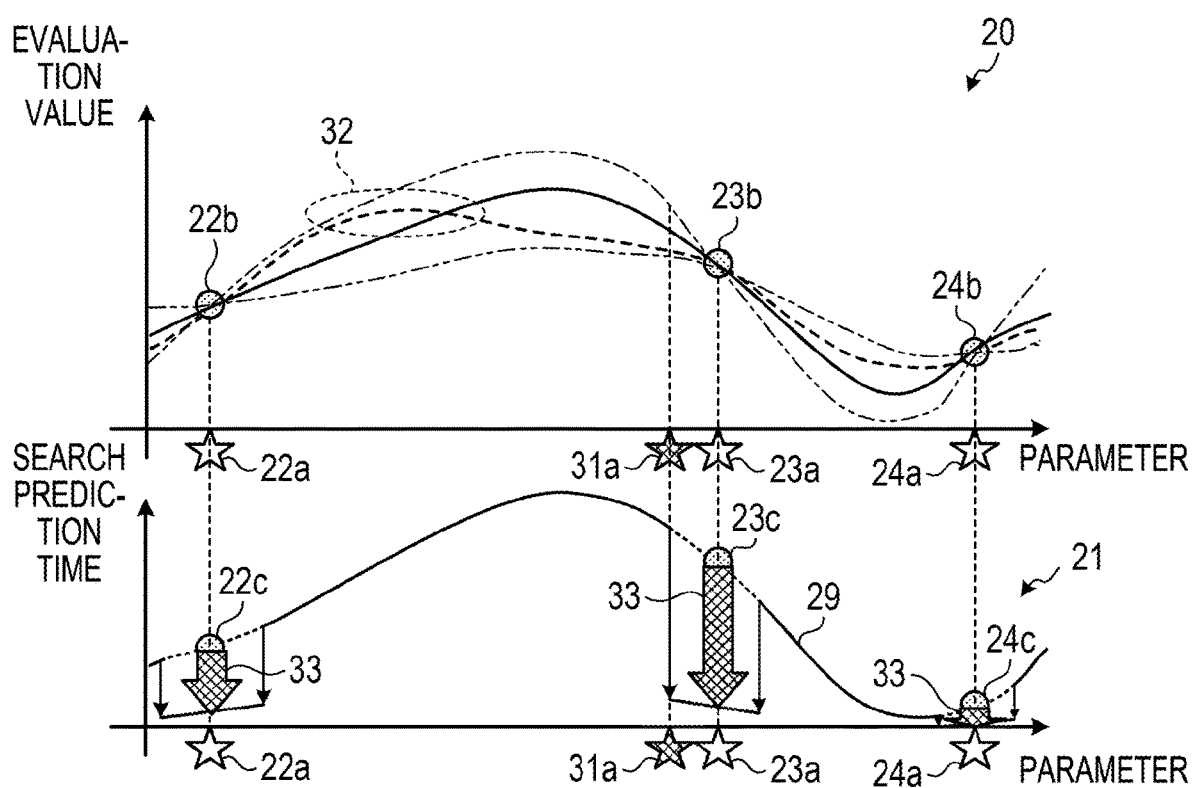
FIG. 4 is a diagram illustrating an example of a case of determining a new search point at which a best result may be obtained per unit time by reusing an evaluation result.

Meanwhile, in a case where there is the time limit, the search prediction time becomes as illustrated in FIG. 4 when the evaluation result of the searched search point is reused in order to shorten the search time. FIG. 4 is a diagram illustrating an example of a case of determining a new search point at which a best result may be obtained per unit time by reusing an evaluation result. As illustrated in FIG. 4, in the vicinity of the search times 22c, 23c, and 24c corresponding to the existing search points 22a, 23a, and 24a of the graph 21, the search prediction time is shortened as indicated by an arrow 33. That is, in the vicinity of the search times 22c, 23c, and 24c, the search prediction time is shorter than the expected value on the function 29. In this state, for example, when the scheme based on Snoek is applied, the new search point becomes a search point 31a. That is, in the scheme based on Snoek, the search point 31a where a value obtained by dividing the evaluation value by the search prediction time becomes the maximum becomes the new search point. However, an area in which the evaluation value is desired to be found is originally the vicinity of an area 32 of the graph 20.

Figure 5:
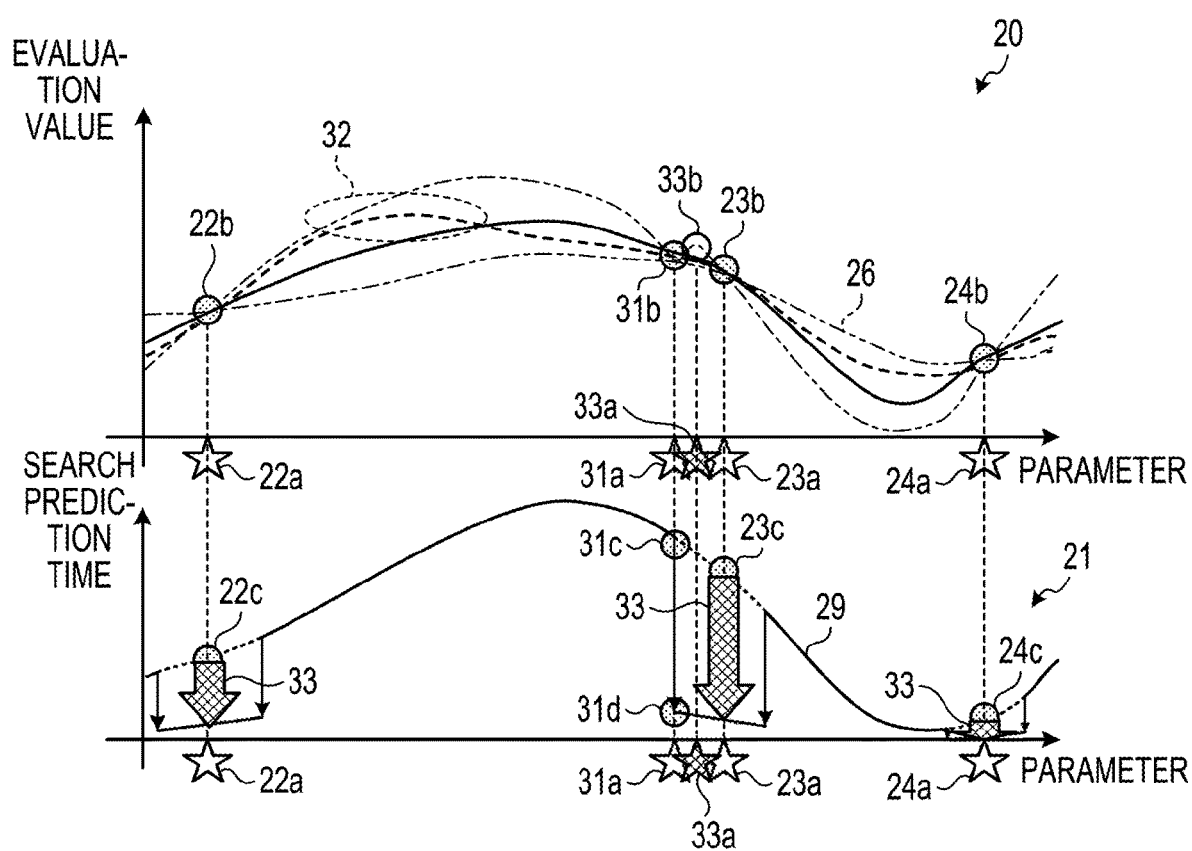
FIG. 5 is a diagram illustrating an example of a case of determining a next new search point.

Here, a case where the search point 31a is adopted and the new search point next to the search point 31a is determined by the scheme based on Snoek will be described with reference to FIG. 5. FIG. 5 is a diagram illustrating an example of a case of determining a next new search point. In FIG. 5, a new peak of the confidence interval upper limit 26 appears between the search point 31a and the search point 23a of the graph 20, that is, between the evaluation value 31b and the evaluation value 23b. In addition, in FIG. 5, the search prediction time between the search point 31a and the search point 23a is shorter than the search prediction time which the function 29 between the search point 22a and the search point 31a in the graph 21 may take. Therefore, in this state, for example, when the scheme based on Snoek is applied, the next new search point is a search point 33a corresponding to an evaluation value 33b which is a peak between the evaluation value 31b and the evaluation value 23b in the confidence interval upper limit 26. Further, the search prediction time by the function 29 of the search point 31a is a search prediction time 31c, but the evaluation result is reused, and as a result, the search time of the search point 31a is a search time 31d. As described above, in the scheme based on Snoek, when the evaluation result is reused simultaneously, originally, a vicinity of the area 32 of which the evaluation value is desired to be discovered is not searched and only the existing search point, that is, the vicinity of the evaluation value is searched, and as a result, there is a case where the search point may not deviate from the existing search point.

Therefore, in the present disclosure, in a case where there is the time limit, the search points may be dispersed so that only the vicinity of the existing search point is not searched while simultaneously reusing the evaluation result. That is, in the present disclosure, by reusing the result, a search conscious of improvement per time and a wide search are compatible, and a balance of the searches is changed according to the closing time. That is, in the present disclosure, when a remaining time until the closing time is long, the search is performed widely and when the remaining time is short, the search is performed by reusing the result.

In other words, when the process of determining the search point in the process of estimating the function is executed, the search point determining device 100 calculates a search prediction time and a confidence interval upper limit obtained by using the Gaussian process for the function in each search candidate point, from a past search result of the function. The search point determining device 100 creates an area in a parameter space for each search candidate point by using a position of a search point close to the search candidate point in a past search result, a search prediction time corresponding to each search candidate point, and a confidence interval upper limit corresponding to each search candidate point. The search point determining device 100 determines the search point based on the size of the area in a plurality of parameter spaces. Therefore, the search point determining device 100 may shorten the time required for the optimization of the parameter. Further, the search point determining device 100 may establish an experiment plan in a form suitable for the parameter optimization in the presence of the time limit.

In the embodiment, the description is made by using the confidence interval upper limit is used, but the expected value may be used instead of the confidence interval upper limit. That is, it is known that it is empirically good to use the confidence interval upper limit, but the same process may be performed even with the expected value.

Figure 6:
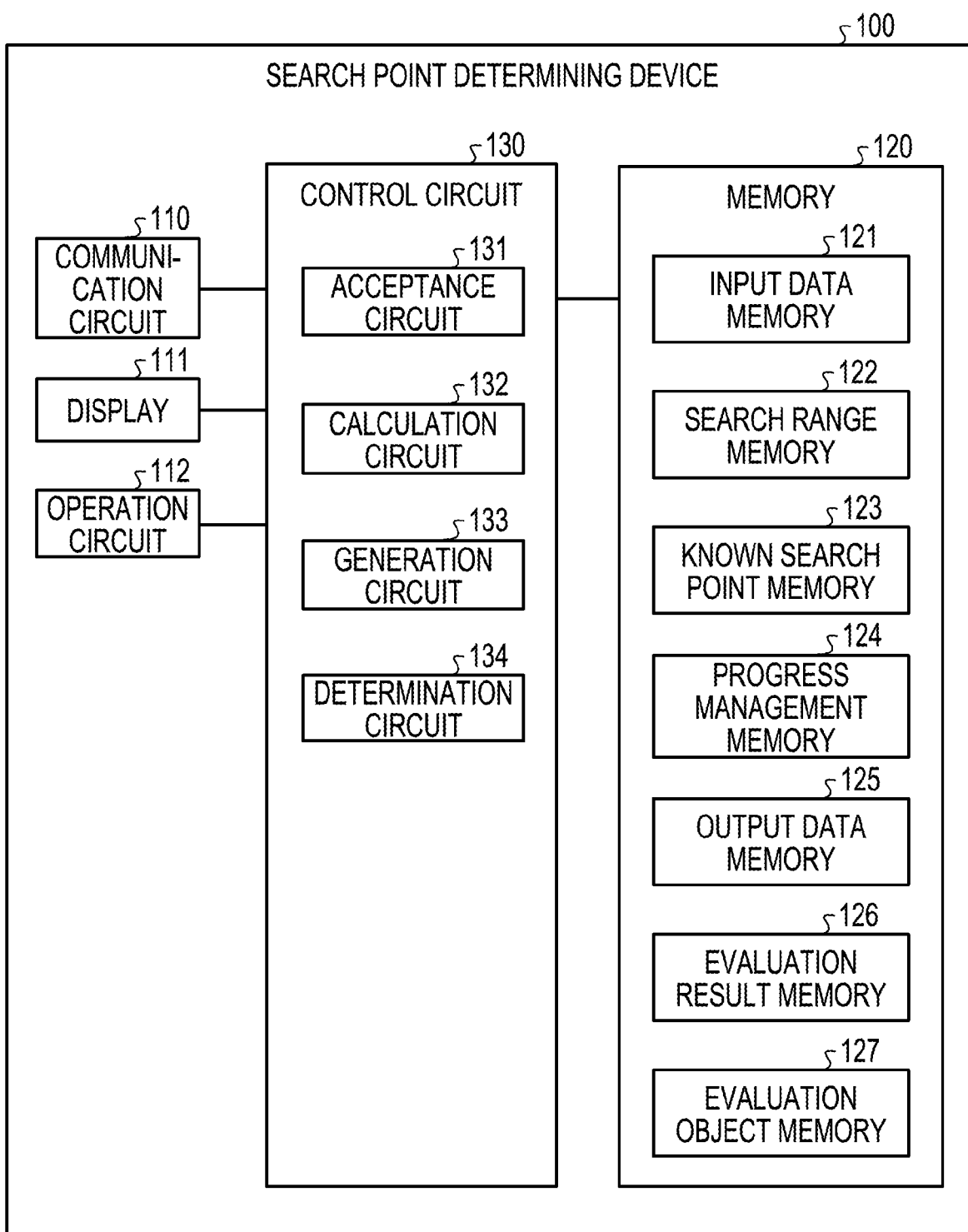
FIG. 6 is a block diagram illustrating an example of a configuration of a search point determining device according to an embodiment.

Next, the configuration of the search point determining device 100 will be described with reference to FIG. 6. FIG. 6 is a block diagram illustrating an example of a configuration of a search point determining device according to an embodiment.

As illustrated in FIG. 6, the search point determining device 100 includes a communication circuit 110, a display 111, an operation circuit 112, a memory 120, and a control circuit 130. Further, in addition to the functional circuits illustrated in FIG. 6, the search point determining device 100 may include various functional circuits of a known computer, for example, functional circuits such as various input devices or audio output devices. As the search point determining device 100, for example, a stationary personal computer or a server may be adopted. Further, in the search point determining device 100, the stationary personal computer or a portable personal computer may be adopted.

The communication circuit 110 is implemented by, for example, a network interface card (NIC). The communication circuit 110 is a communication interface that is connected with another information processing device via a network (not illustrated) in a wired or wireless scheme to be responsible for communication of information with another information processing device.

The display 111 is a display device for displaying various kinds of information. The display 111 is implemented by, for example, a liquid crystal display as the display device. The display 111 displays various screens such as a display screen input from the control circuit 130.

The operation circuit 112 is an input device that accepts various operations from a user of the search point determining device 100. The operation circuit 112 is implemented by, for example, a keyboard or a mouse as an input device. The operation circuit 112 outputs the operation input by the user to the control circuit 130 as operation information. Further, the operation circuit 112 may be implemented by, for example, a touch panel as an input device and the display device of the display 111, and the input device of the operation circuit 112 may be integrated.

The memory 120 is implemented by, for example, a semiconductor memory element such as a Random Access Memory (RAM) or a flash memory, or a storage device such as a hard disk or an optical disk. The memory 120 includes an input data memory 121, a search range memory 122, a known search point memory 123, a progress management memory 124, an output data memory 125, an evaluation result memory 126, and an evaluation object memory 127. Further, the memory 120 stores information used for the process in the control circuit 130.

The input data memory 121 stores input data for a model of, for example, machine learning. The input data is, for example, learning data for learning in, for example, the model of the machine learning. Examples of the learning data may include an FAQ collection of the call center and various manuals. The input data is stored in the input data memory 121 in advance. Further, the input data may be acquired from another information processing device (not illustrated) through the communication circuit 110 and stored in the input data memory 121.

Figure 7:
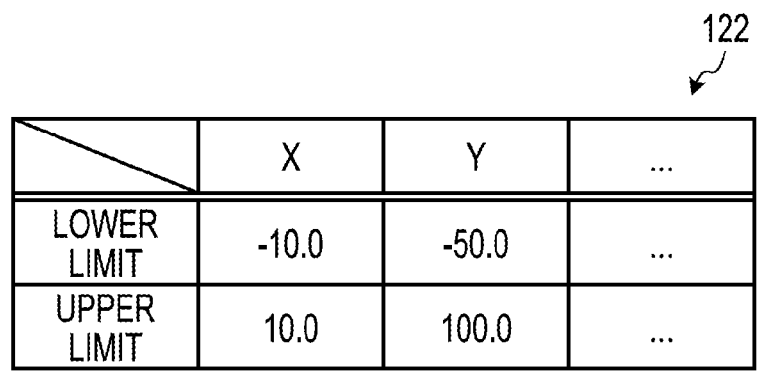
FIG. 7 is a diagram illustrating an example of a search range memory.

The search range memory 122 stores a search range accepted from the user. FIG. 7 is a diagram illustrating an example of a search range memory. As illustrated in FIG. 7, the search range memory 122 has items such as "X" and "Y" for a horizontal axis and items such as "lower limit" and "upper limit" for a vertical axis. Further, the horizontal axis corresponds to the number of dimensions of the parameter space, and in a case of N dimensions, the horizontal axis has N items.

The "X" and "Y" of the horizontal axis are information indicating axes in the parameter space. FIG. 7 illustrates an example in a case of 2 dimensions. The "lower limit" and the "upper limit" of the vertical axis are information indicating values which the axes in the parameter space may take, that is, a lower limit value and an upper limit value of the search range. In the example of FIG. 7, in the search range, an X axis indicates a range of a lower limit value of "−10.0" to an upper limit value of "10.0" and a Y axis indicates a range of a lower limit value "−50.0" to an upper limit value of "100.0."

Figure 8:
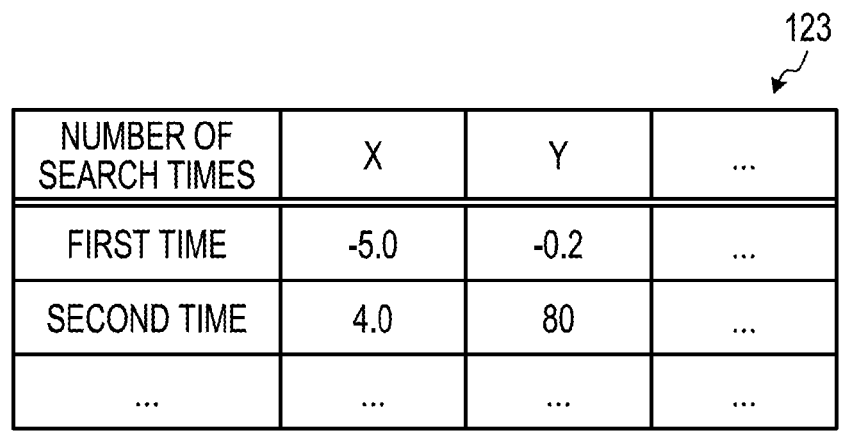
FIG. 8 is a diagram illustrating an example of a known search point memory.

Referring back to the description of FIG. 6, the known search point memory 123 stores a known search point which is a search point where the evaluation value is obtained. FIG. 8 is a diagram illustrating an example of a known search point memory. As illustrated in FIG. 8, the known search point memory 123 has items such as "the number of search times," "X," and "Y."

"The number of search times" is information indicating the number of search times of the search point. The "X" and "Y" are information indicating values of axes in the parameter space. Further, FIG. 8 illustrates an example in a case of 2 dimensions. In an example of a first row of FIG. 8, a search point where the number of search times is determined as "first time" indicates that the value of the X axis is "−5.0" and the value of the Y axis is "−0.2."

Referring back to the description of FIG. 6, the progress management memory 124 stores information on a time such as a time limit of a search point determining process. FIG. 9 is a diagram illustrating an example of a progress management memory. As illustrated in FIG. 9, the progress management memory 124 has items such as "start time," "current time," "end time," and "remaining time."

The "start time" is information indicating a time when execution of the search point determining process starts. The "current time" is information indicating a current time and is frequently updated by, for example, the control circuit 130. The "end time" is information indicating a time when execution of the search point determining process ends. The "remaining time" is information indicating a remaining time from the current time to the end time, that is, a time limit for executing the search point determining process. In the example of FIG. 9, since the search point determining process is started at "10:00:00," the current time is "14:00:00", and the end time is "18:00:00," it is indicated that the reaming time is "04:00:00."

Referring back to FIG. 6, in the output data memory 125, for example, the input data is input into the model of the machine learning that executes evaluation by the control circuit 130, and the output data output by the model is stored. For example, the output data is used for evaluating the parameter of the machine learning.

The evaluation result memory 126 stores the evaluation result of each search point, that is, the evaluation value at each search point in association with each search point. Further, the evaluation result memory 126 may store the search time at each search point in association with each search point.

The evaluation object memory 127 stores, for example, the evaluation object 50 illustrated in FIG. 1. Further, for example, the evaluation object memory 127 may store the model of the machine learning as the evaluation object. In addition, the evaluation object is stored in the evaluation object memory 127 before the search start. Further, the evaluation object may be stored in, for example, an external information processing device of the search point determining device 100, and a method for calling the evaluation object by accessing the information processing device may be stored in the evaluation object memory 127.

The control circuit 130 is implemented by, for example, executing a program stored in an internal storage device with the RAM as a task area by a central processing unit (CPU) or a micro processing unit (MPU). In addition, the control circuit 130 may be implemented by an integrated circuit such as an application specific integrated circuit (ASIC) or a field programmable gate array (FPGA).

The control circuit 130 includes an acceptance circuit 131, a calculation circuit 132, a generation circuit 133, and a determination circuit 134, and implements or executes information processing functions and operations described below. That is, each processing circuit of the control circuit 130 executes the search point determining process. Further, an internal configuration of the control circuit 130 is not limited to the configuration illustrated in FIG. 6, and other configurations may be adopted as long as the configurations perform the information processing to be described below.

The acceptance circuit 131 accepts, for example, the search range input from the operation circuit 112 by the user.

The acceptance circuit 131 stores the accepted search range in the search range memory 122. Further, the acceptance circuit 131 accepts, for example, the end time input from the operation circuit 112 by the user. The acceptance circuit 131 stores the accepted end time in the progress management memory 124. When the search range and the end time are accepted, the acceptance circuit 131 outputs a search instruction to the calculation circuit 132.

The acceptance circuit 131 stores the current time as the start time in the progress management memory 124, and starts updating the current time of the progress management memory 124. When the start time is stored in the progress management memory 124, the acceptance circuit 131 starts calculation of the remaining time and storage in the progress management memory 124 based on the current time and the end time. That is, the acceptance circuit 131 manages a progress of the search point determining process. Further, the current time and the remaining time are updated periodically, for example, every second.

When the search instruction is input from the acceptance circuit 131, the calculation circuit 132 acquires the search range by referring to the search range memory 122. The calculation circuit 132 executes the initial search for the function representing the process of the evaluation object based on the acquired search range. The calculation circuit 132 randomly determines, for example, one or more search points. Further, the number of search points in the initial search may be two or more. When the search point is determined, the calculation circuit 132 sets the parameter of the process of the evaluation object at the determined search point in the process of the evaluation object. The calculation circuit 132 acquires the input data by referring to the input data memory 121. The calculation circuit 132 acquires the output data by executing the process of the evaluation object for the acquired input data, and stores the acquired output data in the output data memory 125. Further, the calculation circuit 132 acquires the evaluation result by evaluating the acquired output data, stores the acquired evaluation result in the evaluation result memory 126, and stores the determined search point in the known search point memory 123. That is, the determined search point becomes a known search point since the evaluation result is obtained.

When the initial search is terminated or a continuation instruction is input from the determination circuit 134, the calculation circuit 132 calculates a Gaussian process based on the known search point for the function in the search range of the process of the evaluation object. That is, the calculation circuit 132 calculates the confidence interval upper limit and the confidence interval lower limit obtained by using the Gaussian process for the function. Further, the calculation circuit 132 calculates the search prediction time based on the known search point for the function in the search range of the process of the evaluation object. That is, the calculation circuit 132 calculates a function representing the search prediction time in the search range. Further, the function in the search range of the process of the evaluation object may be determined as a group of search candidate points. In addition, it may be said that the function representing the search prediction time is a function representing a parameter dependency of the execution time. The calculation circuit 132 outputs the calculated Gaussian process (confidence interval upper limit and confidence interval lower limit) and function of the search prediction time, to the generation circuit 133.

When the Gaussian process and the function of the search prediction time are input from the calculation circuit 132, the generation circuit 133 acquires the known search point by referring to the known search point memory 123. The generation circuit 133 generates an area in the parameter space for each search candidate point with respect to, for example, an interval of a function between a predetermined known search point and an adjacent search point, among the acquired know search points. The generation circuit 133 may use, for example, an N-dimensional hyper-rectangular parallelepiped or an N-dimensional hyperball as the area in the parameter space. That is, the area in the parameter space has an extent of a space around the search point as an index and indicates how much known search points are not present around the search candidate point. In the N-dimensional hyper-rectangular parallelepiped, the area in the parameter space indicates the extent of the space with respect to a specific direction. In the N-dimensional hyperball, the area in the parameter space indicates the extent of the space with respect to all directions. Further, in the parameter space, the area is indicated by using the evaluation value corresponding to the search point, but in the following description, the area may be expressed simply as the search point.

In a case where the N-dimensional hyper-rectangular parallelepiped is used, the generation circuit 133 uses, for example, a super volume of the N-dimensional hyper-rectangular parallelepiped connecting known search points around the search candidate points. In the case where the N-dimensional hyperball is used, the generation circuit 133 uses the super volume of the N-dimensional hyperball whose radius is a distance from the known search point nearest to the search candidate point. Further, when the area in the parameter space is generated, the parameter is normalized.

When the generation circuit 133 generates the area in the parameter space for each search candidate point, the generation circuit 133 calculates a correction score for each search candidate point based on the confidence interval upper limit of the Gaussian process. The correction score is an evaluation value in a case where a progress ratio is taken into consideration when a difference between the evaluation value of the confidence interval upper limit and an evaluation value of the known search point with a highest evaluation value is taken as a pre-correction score. The generation circuit 133 calculates a progress radio indicating how much the current time has elapsed for a time from the start time to the end time, by referring to the progress management memory 124. In the example of FIG. 9, since the time from the start time to the end time is 8 hours and the remaining time is 4 hours, a maximum executable execution time is 4 hours and the progress rate is 50%, that is, "0.5."

The generation circuit 133 calculates the correction score for each search candidate point based on Equation (1) below. Further, the pre-correction score is calculated based on Equation (2) below.

$$\text{Correction score} = \text{pre-correction score} \times (1 + \text{progress ratio} \times (1 - \text{execution time/remaining time})) \quad (1)$$

$$\text{Pre-correction score} = \text{evaluation value of confidence interval upper limit corresponding to search candidate point} - \text{evaluation value of known search point with highest evaluation value} \quad (2)$$

The generation circuit 133 outputs the correction score calculated at each search candidate point, the size of the area in the parameter space, and the function of the search prediction time to the decision circuit 134.

In other words, the generation circuit 133 creates an area in a parameter space for each search candidate point by using a position of a search point close to the search candidate point in a past search result, a search prediction time corresponding to each search candidate point, and a confidence interval upper limit corresponding to each search candidate point. Further, the generation circuit 133 corrects the size of the area in the parameter space according to the position of the search point in the past search result. Further, the search candidate points are set within a range where the expected value of the function is higher than the evaluation value of the search point having the highest evaluation value in the past search result.

When the correction score at each search candidate point, the size of the area within the parameter space, and the function of the search prediction time are input from the generation circuit 133, the determination circuit 134 calculates the evaluation score for each search candidate point by Equation (3) below. Further, the search prediction time at each search candidate point may be determined based on the function of the search prediction time.

$$\text{Evaluation score} = \text{correction score} \times \text{area size/search prediction time} \quad (3)$$

The determination circuit 134 compares the evaluation scores at respective search candidate points and determines the search candidate point having the highest evaluation score as the search point. That is, the determination circuit 134 determines the search point based on the correction score, the size of the area, and the search prediction time. Further, a product of the correction score and the size of the area represents an approximate value of the sum of ambiguities of evaluation values decreasing around the search candidate point by the evaluation. This is to indicate how much ambiguity may be reduced at a time as an index, and will approximate an entropy search. In other words, the evaluation score is an index representing how much ambiguity may be reduced per time.

When the search point is determined, the determination circuit 134 executes evaluation of the determined search point. Specifically, the determination circuit 134 sets the parameter of the process of the evaluation object at the determined search point in the process of the evaluation object. The determination circuit 134 acquires the input data by referring to the input data memory 121. Further, the determination circuit 134 acquires the evaluation object by referring to the evaluation object memory 127. The determination circuit 134 acquires the output data by executing the process of the evaluation object for the acquired input data, and stores the acquired output data in the output data memory 125. Further, the determination circuit 134 acquires the evaluation result by evaluating the acquired output data, stores the evaluation result in the evaluation result memory 126, and stores a current search point in the known search point memory 123.

When the determination circuit 134 stores the current search point in the known search point memory 123, the determination circuit 134 determines whether to search for the next search point. For example, the determination circuit 134 determines to search the next search point, when the function of the expected value of the evaluation object is likely to be further improved or when there is the remaining time. In a case where the next search point is determined, the determination circuit 134 outputs a continuation instruction to the calculation circuit 132.

For example, the determination circuit 134 determines not to search the next search point, when the function of the expected value of the evaluation object is not likely to be further improved or when there is no remaining time due to the arrival of the end time. In a case where the next search point is not searched, the determination circuit 134 ends the search point determining process. The evaluation result memory 126 stores the evaluation result of each search point, that is, the evaluation value at each search point in association with each search point. Further, in the known search point memory 123, the parameter at each search point is stored.

In other words, the determination circuit 134 determines the search point based on the size of the area in a plurality of parameter spaces. Further, the determination circuit 134 determines the search point based on a value obtained by dividing the product of the improvement value from the evaluation value in the past search result at each search candidate point by the size of the area by the search prediction time.

Figure 10:
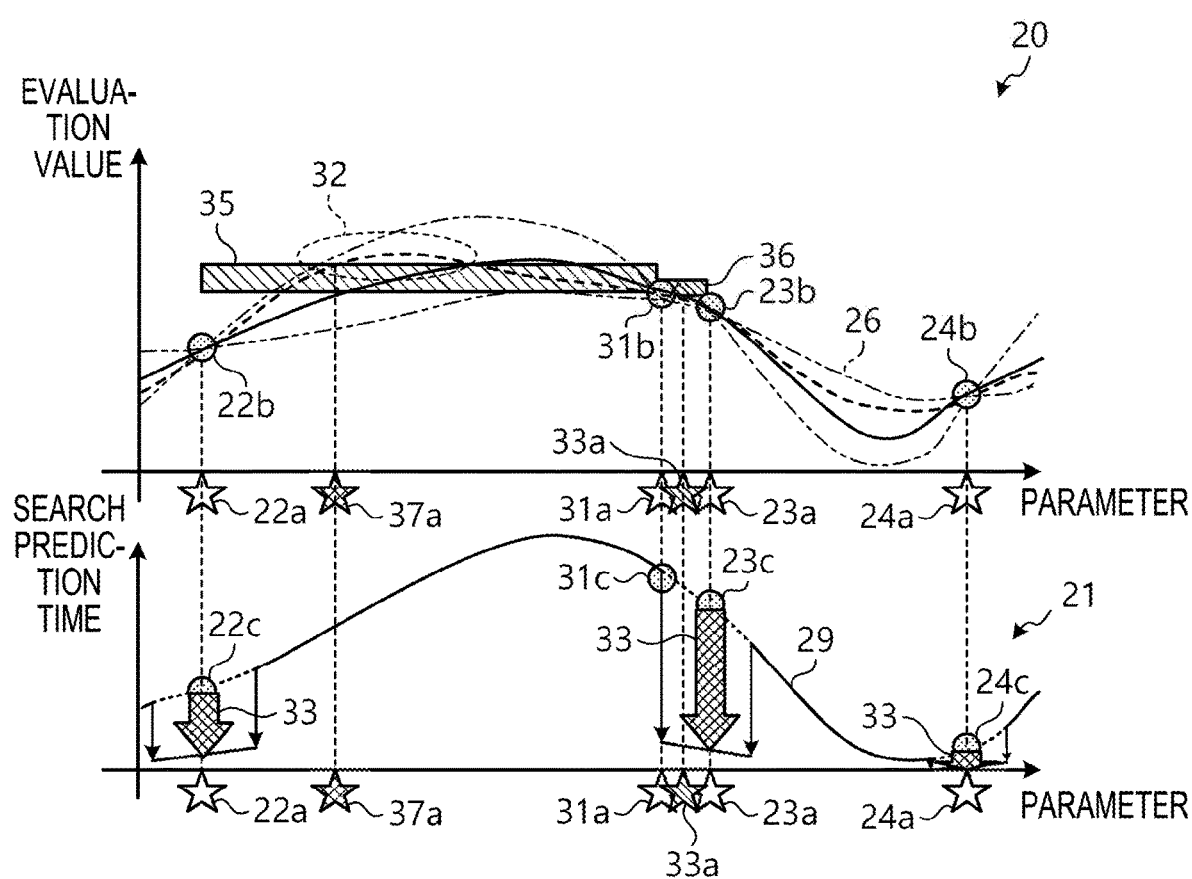
FIG. 10 is a diagram illustrating an example of a case of determining a next new search point according to an embodiment.

Here, the case of determining the next new search point in the embodiment from the state of FIG. 4 will be described with reference to FIG. 10. FIG. 10 is a diagram illustrating an example of a case of determining a next new search point according to an embodiment. In FIG. 10, as in FIG. 5, a new peak of the confidence interval upper limit 26 appears between the search point 31a and the search point 23a of the graph 20, that is, between the evaluation value 31b and the evaluation value 23b. In addition, in FIG. 10, as in FIG. 5, the search prediction time between the search point 31a and the search point 23a is shorter than the search prediction time which the function 29 between the search point 22a and the search point 31a in the graph 21 may take. In this case, the search point determining device 100 generates, for each search candidate point, an area 35 and an area 36 in the parameter space from the evaluation value 31b of the search point 31a toward the evaluation value 22b of the search point 22a and the evaluation value 23b of the search point 23a. The search point determining device 100 determines a search point 37a based on the area 35 in the vicinity of the area 32 which is the area where the evaluation value is originally desired to be found based on the evaluation score calculated by Equation (3) above. Further, since the evaluation score at the search point 33a based on the area 36 is lower than the evaluation score at the search point 37a, the search point 33a is not selected. In this way, the search point determining device 100 may determine the next new search point in the vicinity of the area 32, which is the area where the evaluation value is originally desired to be found.

Figure 11:
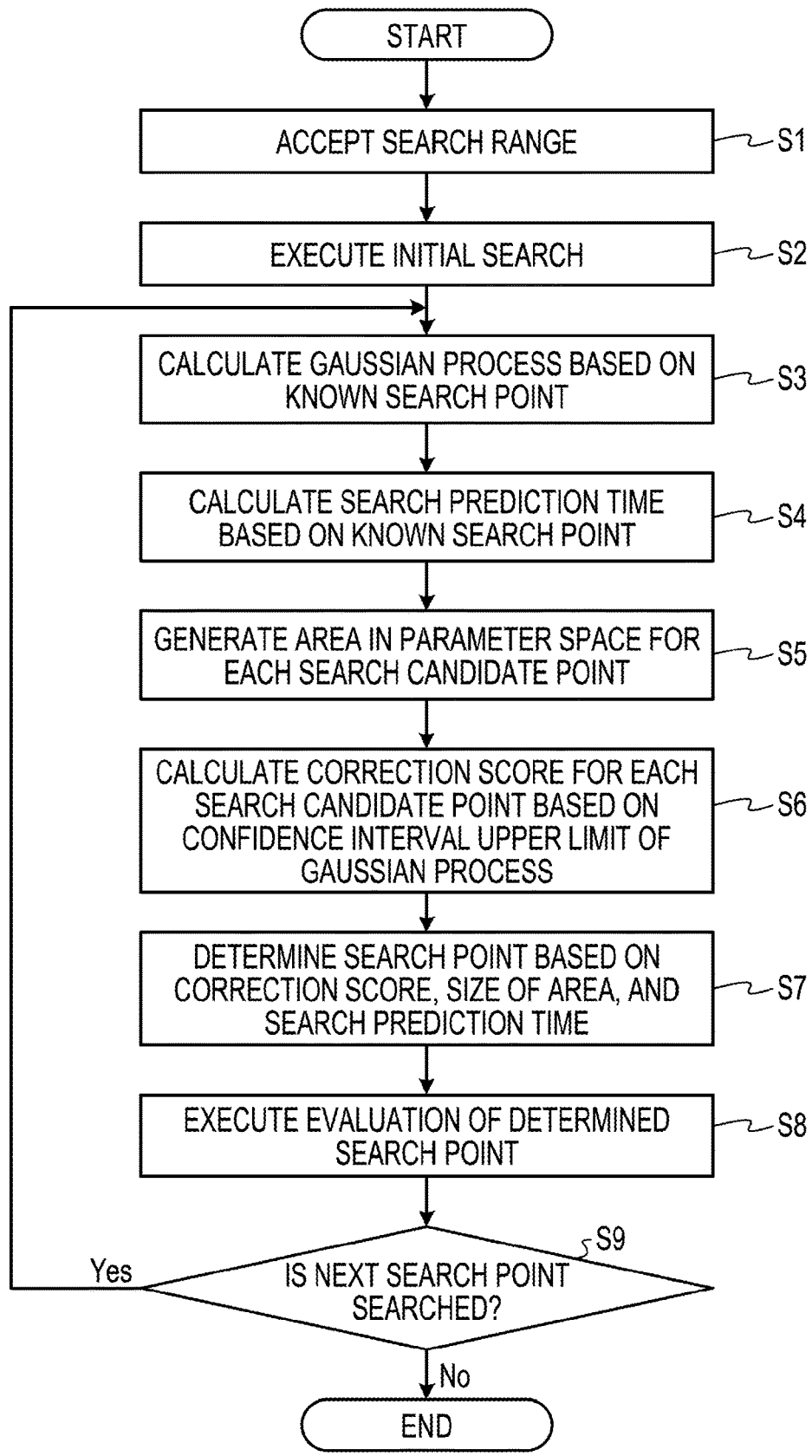
FIG. 11 is a flowchart illustrating an example of a search point determining process according to an embodiment.

Next, the operation of the search point determining device 100 of the embodiment will be described. FIG. 11 is a flowchart illustrating an example of a search point determining process according to an embodiment.

The acceptance circuit 131 of the search point determining device 100 accepts, for example, the search range input from the operation circuit 112 by the user (step S1). Further, the acceptance circuit 131 accepts, for example, the end time input from the operation circuit 112 by the user. When the search range and the end time are accepted, the acceptance circuit 131 outputs a search instruction to the calculation circuit 132. In addition, the acceptance circuit 131 stores the accepted end time and the start time based on the current time in the progress management memory 124, and starts updating the current time and the remaining time.

When the search instruction is input from the acceptance circuit 131, the calculation circuit 132 acquires the search range by referring to the search range memory 122. The calculation circuit 132 executes the initial search for the function representing the process of the evaluation object based on the acquired search range (step S2). The calculation circuit 132 stores the search point determined by the initial search in the known search point memory 123 and ends the initial search.

When the initial search ends, the calculation circuit 132 calculates the Gaussian process based on the known search point for the function in the search range of the process of the evaluation object (step S3). Further, the calculation circuit 132 calculates the function of the search prediction time based on the known search point for the function in the search range of the process of the evaluation object (step S4). The calculation circuit 132 outputs the calculated Gaussian process and function of the search prediction time, to the generation circuit 133.

When the Gaussian process and the function of the search prediction time are input from the calculation circuit 132, the generation circuit 133 acquires the known search point by referring to the known search point memory 123. The generation circuit 133 generates the area in the parameter space for each search candidate point (step S5). When the generation circuit 133 generates the area in the parameter space for each search candidate point, the generation circuit 133 calculates a correction score for each search candidate point based on the confidence interval upper limit of the Gaussian process (step S6). The generation circuit 133 outputs the correction score calculated at each search candidate point, the size of the area in the parameter space, and the function of the search prediction time, to the decision circuit 134.

When the correction score at each search candidate point, the size of the area within the parameter space, and the function of the search prediction time are input from the generation circuit 133, the determination circuit 134 determines the search point based on the corrections core, the size of the area, and the search prediction time (step S7). When the search point is determined, the determination circuit 134 executes evaluation of the determined search point (step S8). The determination circuit 134 stores the evaluation result in the evaluation result memory 126 and stores the current search point in the known search point memory 123. When the determination circuit 134 stores the current search point in the known search point memory 123, the determination circuit 134 determines whether to search for the next search point (step S9).

When the determination circuit 134 determines to search for the next search point ("Yes" in step S9), the determination circuit 134 outputs a continuation instruction to the calculation circuit 132 and returns to step S3. When the determination circuit 134 determines not to search the next search point ("No" in step S9), the determination circuit 134 ends the search point determining process. Therefore, the search point determining device 100 may shorten a time required for optimization of the parameter. Further, the search point determining device 100 may establish an experiment plan in a form suitable for the parameter optimization in the presence of the time limit. That is, the search point determining device 100 may obtain the search point suitable for the parameter optimization in the presence of the time limit. In addition, the search point determining device 100 may evaluate a point at which it is considered that a best score (evaluation value) may be obtained according to the execution time of execution and evaluation. Further, even when the execution result is reused, the search point determining device 100 may avoid persistently evaluating the vicinity of the known search point. Therefore, the search point determining device 100 may safely reuse the execution result. In addition, the search point determining device 100 may search for a search point at which score-up may be targeted tightly according to the closing time.

As described above, the search point determining device 100 determines the search point in a function estimating process. That is, the search point determining device 100 calculates the search prediction time and a confidence interval upper limit obtained by using the Gaussian process for the function in each search candidate point, from a past search result of the function. Further, the search point determining device 100 creates an area in a parameter space for each search candidate point by using a position of a search point close to the search candidate point in a past search result, a search prediction time corresponding to each search candidate point, and a confidence interval upper limit corresponding to each search candidate point. Further, the search point determination device 100 determines the search point based on the size of an area in a plurality of parameter spaces. Therefore, the search point determination device 100 may shorten a time required for optimization of the parameter. Further, the search point determination device 100 may establish an experiment plan in a form suitable for the parameter optimization in the presence of the time limit.

In the search point determining device 100, the area in the parameter space is the N-dimensional hyper-rectangular parallelepiped. As a result, it is possible to determine a search point apart from the existing search point in a wide range.

In the search point determining device 100, the area in the parameter space is the N-dimensional hyperball. As a result, it is possible to determine a search point apart from the existing search point in a wide range.

The search point determining device 100 corrects the size of the area in the parameter space according to the position of the search point in the past search result. As a result, it is possible to determine the search point apart from the existing search point.

In the search point determining device 100, the search candidate points are set within a range where the expected value of the function is higher than the evaluation value of the search point having the highest evaluation value in the past search result. As a result, the search point suitable for the parameter optimization may be obtained.

The search point determining device 100 determines the search point based on a value obtained by dividing the product of the improvement value from the evaluation value in the past search result at each search candidate point by the size of the area by the search prediction time. As a result, it is possible to determine the search point by considering the search prediction time and a state apart from the existing search point.

In the embodiment, the search point of the initial search is randomly determined, but the present disclosure is not limited thereto. For example, the search point of the initial search may be determined by using the upper and lower limits of the search range, or by dividing the search range into a plurality of ranges and using respective median values.

Each component of each unit illustrated needs not particularly be configured as physically illustrated. That is, a concrete form of distribution or integration of the respective units is not limited to that illustrated, and all or some of the units may be configured to be functionally or physically distributed or integrated in arbitrary units according to, for example, various loads or use situations. For example, the progress management function of the acceptance circuit 131 may be distributed as another functional circuit. Further, the procedure of the respective processes illustrated is not limited to the procedure described above. The procedure of the respective processes illustrated may be executed at the same time within a scope that does not cause any inconsistency in processing contents or may be changed.

All or predetermined some of the various processing functions performed by each device may be executed on a CPU (or microcomputer such as an MPU or a micro controller unit (MCU),). In addition, all or predetermined some of the various processing functions may be executed on a program interpreted and executed by the CPU (or microcomputer such as an MPU or a micro controller unit (MCU)) or hardware by a wired logic.

Figure 12:
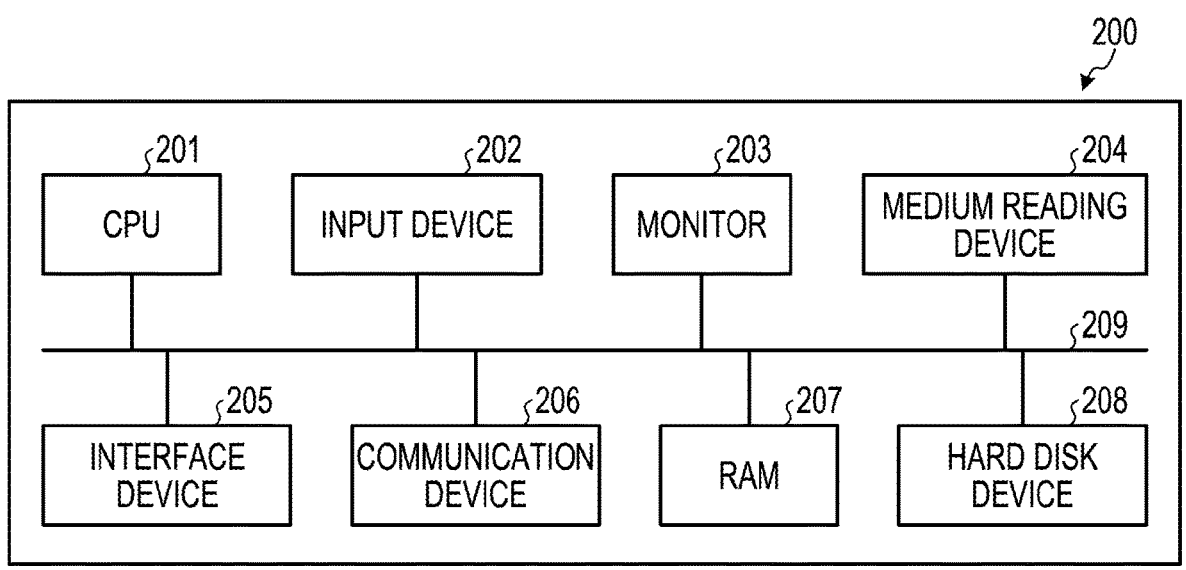
FIG. 12 is a diagram illustrating an example of a computer that executes a search point determining program.

However, the various processes described in each embodiment described above may be implemented by executing a previously prepared program by means of the computer. Therefore, in the following, an example of a computer that executes a program having the same function as the above embodiment will be described. FIG. 12 is a diagram illustrating an example of a computer that executes a search point determining program.

As illustrated in FIG. 12, the computer 200 includes a CPU 201 that executes various operation processes, an input device 202 that accepts a data input, and a monitor 203. Further, the computer 200 includes a medium reading device 204 that reads, for example, the program from a storage medium, an interface device 205 for a connection to various devices, and a communication device 206 for a connection to, for example, another information processing device in a wired or wireless manner. In addition, the computer 200 includes a RAM 207 for temporarily storing various kinds of information and a hard disk device 208. In addition, each of the devices 201 to 208 is connected to a bus 209.

In the hard disk device 208, a search point determining program having the same functions as the processing circuits of the acceptance circuit 131, the calculation circuit 132, the generation circuit 133, and the determination circuit 134 illustrated in FIG. 6 is stored. The hard disk device 208 also stores various data for implementing the input data memory 121, the search range memory 122, the known search point memory 123, the progress management memory 124, the output data memory 125, the evaluation result memory 126, the evaluation object memory 127, and the search point determining program. The input device 202 accepts the input of various information such as operation information from a user of the computer 200. For example, the monitor 203 displays various screens such as a display screen to the user of the computer 200. For example, a printing device is connected to the interface device 205. For example, the communication device 206 has a function similar to that of the communication circuit 110 illustrated in FIG. 6 and is connected to a network (not illustrated) to exchange various kinds of information with, for example, other information processing devices (not illustrated).

The CPU 201 reads each program stored in the hard disk device 208, and develops and executes the read program to the RAM 207, thereby performing various processes. Further, the programs may cause the computer 200 to function as the acceptance circuit 131, the calculation circuit 132, the generation circuit 133, and the determination circuit 134 illustrated in FIG. 6.

The above search point determining program need not be particularly stored in the hard disk device 208. For example, the computer 200 may read and execute a program stored in a storage medium readable by the computer 200. The storage medium readable by the computer 200 corresponds to, for example, a portable recording medium such as a CD-ROM, a DVD disk, or a universal serial bus (USB) memory, a semiconductor memory such as a flash memory, or a hard disk drive. In addition, the search point determining program may be stored in a device connected to, for example, a public line, the Internet, or a LAN, and the computer 200 may read and execute the search point determining program from the device.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A search point determining method in an estimation process of a function, executed by a processor included in a search point determining apparatus, the method comprising:
   calculating a search prediction time and a confidence interval upper limit obtained by using a Gaussian process for the function in each search candidate point from a first search result of the function;
   generating an area in a parameter space for each search candidate point by using a position of a search point close to the relevant search candidate point in a first search result, a search prediction time corresponding to each search candidate point, and a confidence interval upper limit corresponding to each search candidate point;
   determining a search point based on a value obtained by dividing a product of an improvement value from an evaluation value in the first search result at each search candidate point and a size of the area by the search prediction time in a plurality of parameter spaces;
   when a remaining time until a time limit is longer than or equal to a certain threshold, outputting a second search result as a solution of the function by searching more widely than the first search result; and
   when the remaining time is shorter than the certain threshold, outputting a second search result as the solution of the function by reusing the first search result.

2. The search point determining method according to claim 1,
   wherein the area in the parameter space is an N-dimensional hyper-rectangular parallelepiped.

3. The search point determining method according to claim 1,
   wherein the area in the parameter space is an N-dimensional hyperball.

4. The search point determining method according to claim 1,
   wherein the generating corrects the size of the area in the parameter space according to the position of the search point in the first search result.

5. The search point determining method according to claim 1,
   wherein the search candidate point is set within a range where an expected value of the function is higher than an evaluation value of a search point having the highest evaluation value in the first search result.

6. A search point determining apparatus that determines a search point in an estimation process of a function, the apparatus comprising:
   a memory; and
   a processor coupled to the memory and configured to:
   calculate a search prediction time and a confidence interval upper limit obtained by using a Gaussian process for the function in each search candidate point from a first search result of the function,
   generate an area in a parameter space for each search candidate point by using a position of a search point close to the relevant search candidate point in a first search result, a search prediction time corresponding to each search candidate point, and a confidence interval upper limit corresponding to each search candidate point,
   determine a search point based on a value obtained by dividing a product of an improvement value from an evaluation value in the first search result at each search candidate point and a size of the area by the search prediction time in a plurality of parameter spaces,
   when a remaining time until a time limit is longer than or equal to a certain threshold, output a second search result as a solution of the function by searching more widely than the first search result, and
   when the remaining time is shorter than the certain threshold, output a second search result as the solution of the function by reusing the first search result.

7. The apparatus according to claim 6,
   wherein the area in the parameter space is an N-dimensional hyper-rectangular parallelepiped.

8. The apparatus according to claim 6,
   wherein the area in the parameter space is an N-dimensional hyperball.

9. The apparatus according to claim 6,
   wherein the processor is configured to generate corrects the size of the area in the parameter space according to the position of the search point in the first search result.

10. The apparatus according to claim 6,
    wherein the processor is configured to set the search candidate point within a range where an expected value of the function is higher than an evaluation value of a search point having the highest evaluation value in the first search result.

11. A non-transitory computer-readable recording medium storing a program that causes a processor included in a search point determining apparatus to execute a process, the process comprising:
    calculating a search prediction time and a confidence interval upper limit obtained by using a Gaussian process for the function in each search candidate point from a first search result of the function;
    generating an area in a parameter space for each search candidate point by using a position of a search point close to the relevant search candidate point in a first search result, a search prediction time corresponding to each search candidate point, and a confidence interval upper limit corresponding to each search candidate point;
    determining a search point based on a value obtained by dividing a product of an improvement value from an evaluation value in the first search result at each search candidate point and a size of the area by the search prediction time in a plurality of parameter spaces;
    when a remaining time until a time limit is longer than or equal to a certain threshold, outputting a second search result as a solution of the function by searching more widely than the first search result; and
    when the remaining time is shorter than the certain threshold, outputting a second search result as the solution of the function by reusing the first search result.

* * * * *